June 19, 1928.
F. B. DUNN
1,674,197
BRICK CUTTING MACHINE
Filed Feb. 14, 1927    3 Sheets-Sheet 1
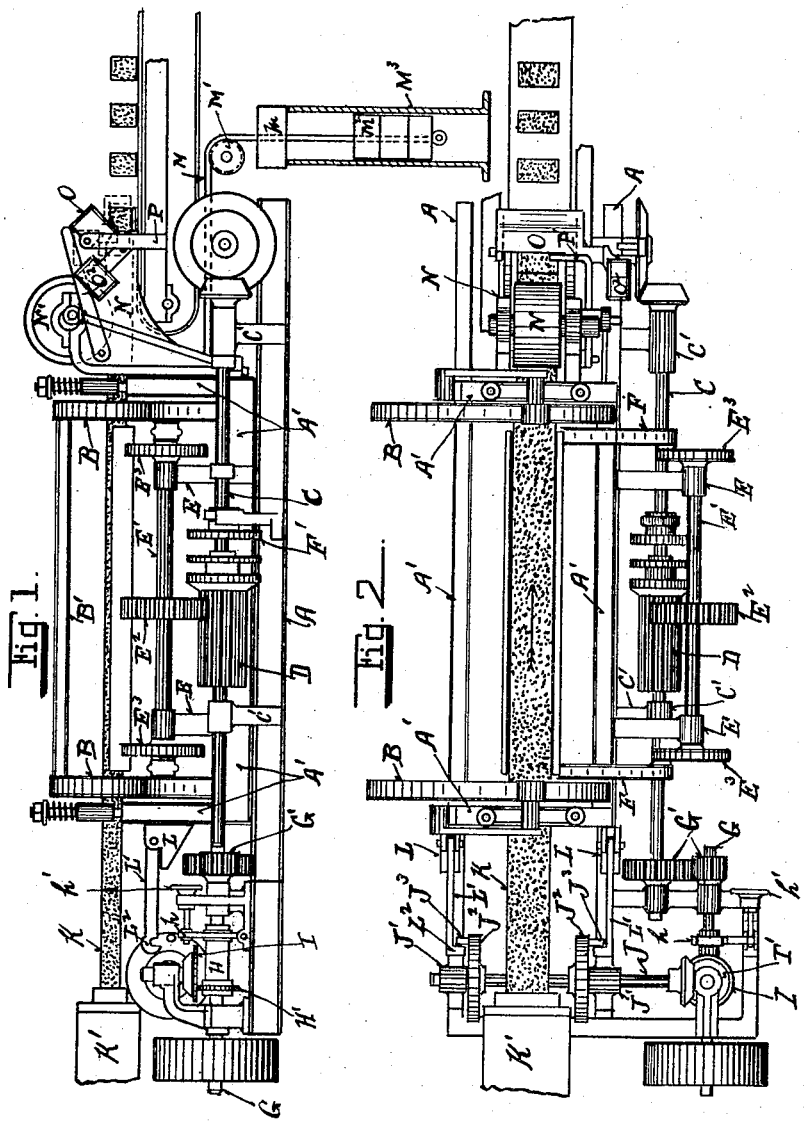
Inventor.
Frank B. Dunn
By H. M. Sturgeon
atty.

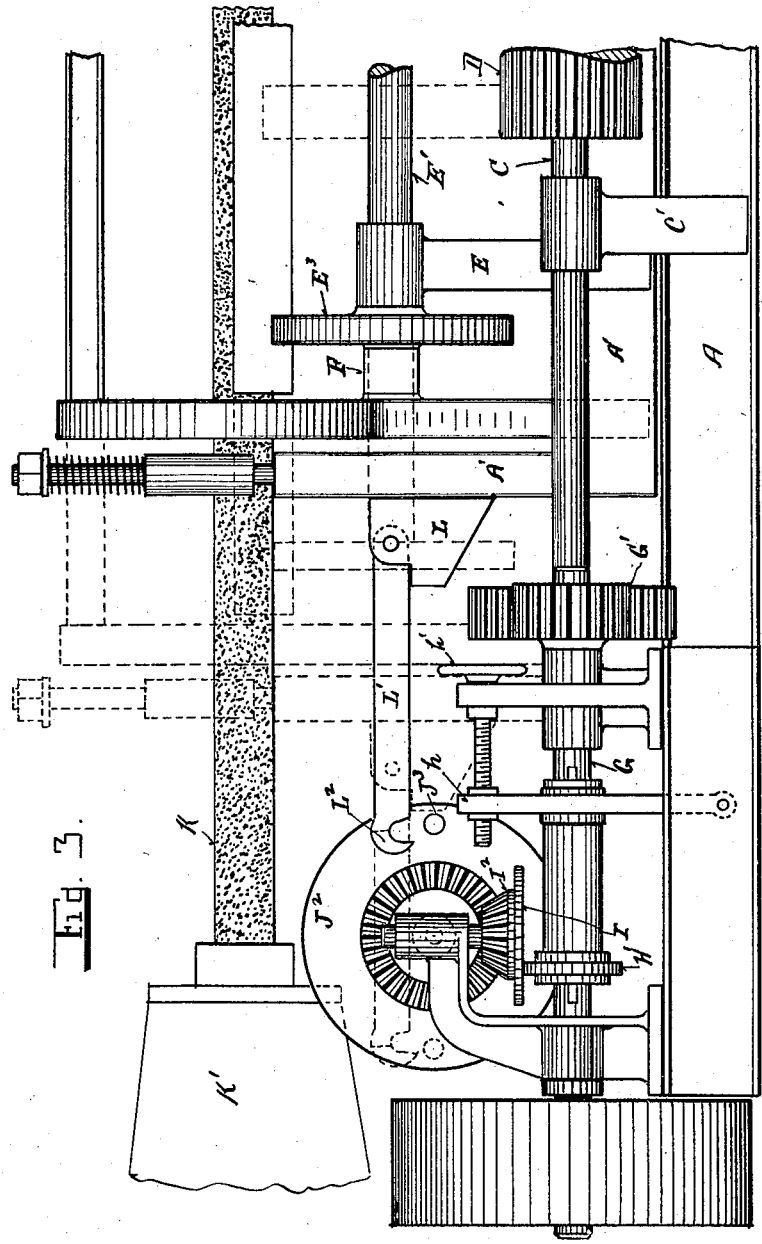

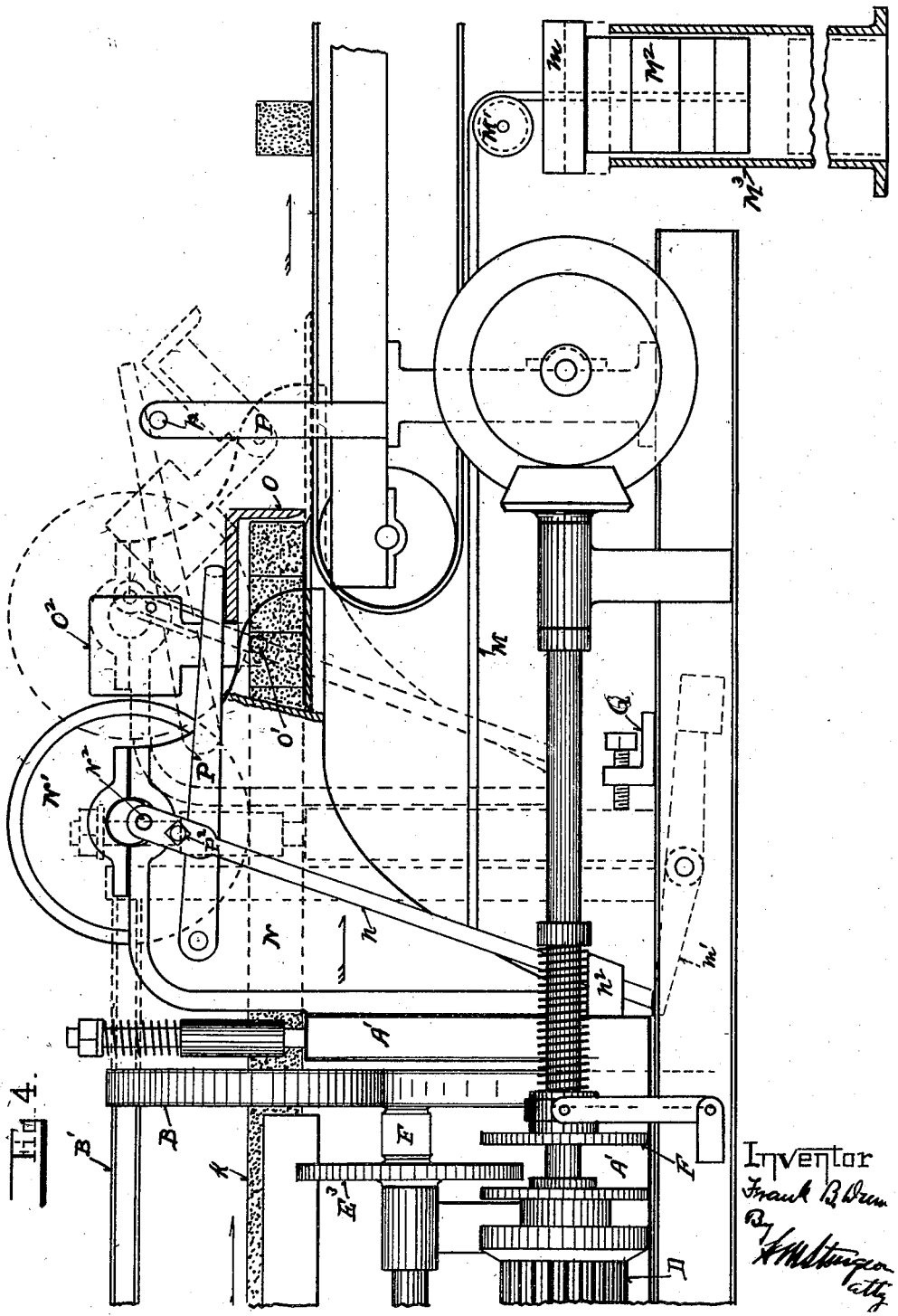

Patented June 19, 1928.

1,674,197

UNITED STATES PATENT OFFICE.

FRANK B. DUNN, OF CONNEAUT, OHIO.

BRICK-CUTTING MACHINE.

Application filed February 14, 1927. Serial No. 168,132.

This invention relates to brick-cutting machines of the type shown and described in U. S. Patents Nos. 967,350 issued to me Aug. 16, 1910, and 1,122,704 issued to me Dec. 29, 1914, and has for its object the elimination of the measuring belt mechanism shown at the left hand of the cutter in Fig. 1, of Patent No. 967,350, in which sufficient power is generated by the forward movement of the clay column on the belt F assisted by the clutch mechanism to cause the cutting mechanism to move with the clay column during the transverse cutting of the column into bricks.

In carrying out my invention I provide a positive left hand movement of the cutting mechanism which draws the cutting mechanism backward a sufficient distance, and also a measuring roller which rides on the column of cut bricks as the same are forced through the machine, to unlock the machine and allow it to be moved toward the right hand in unison with the moving clay column. I also provide a cable and weights of sufficient weight which, added to the force of the clay column, will cause the cutting machine to travel in unison with the column of clay toward the right hand during the cutting operation.

These and other features of my invention are hereafter fully set forth, and explained and are illustrated in the accompanying drawings in which:

Figure 1 is a side view in elevation of a brick-cutting machine embodying my invention.

Figure 2 is a plan view of the same.

Figure 3 is an enlarged view of the left hand end of the machine, and positive drawback mechanism of my invention.

Figure 4 is an enlarged view of the right hand end of the machine and carry off belt mechanism of my invention.

In these drawings A indicates the foundation rails for the machine and A' indicates the frame of the cutting machine which rides on the rails A on suitable rollers (not shown). Suitably mounted in the frame A' of the machine so as to swing transversely of the machine, as shown in U. S. Patent No. 1,122,704, are yokes B, upon which a bridge-bar B', see Fig. 1, is secured, which carries cutting wires (not shown). A power shaft C is mounted in brackets C' secured to the rails A. Secured on the power shaft C is a pinion D. Mounted in suitable bearings E secured on the machine frame A' is a crank shaft E' upon which there is a spur gear $E^2$ which meshes with the pinion D. Pivoted on the crank disks $E^3$ are pitmen F which extend to and are pivoted to the yokes B. F' indicates a clutch mechanism which connects and disconnects the pinion D from the power shaft C at each half revolution of the crank shaft E', so that as the cutting machine moves from the left to the right the yokes are caused to swing transversely of the column of clay.

The mechanism above described is carefully described in the said U. S. patent, and forms no part of the present invention.

G, indicates a counter-shaft which is geared to the power shaft C by means of gears G'. A sliding sleeve H is provided on said shaft G, and a means $h$ to cause the same to slide on the shaft G is provided consisting of a hand screw $h'$. I also provide on the sleeve H a friction pulley H'. Over the center of the counter shaft G, I support a friction disc I and lever gear I', the friction disc is supported in a horizontal position and rests upon the friction pulley H' on the sliding sleeve H, so that the friction pulley can be moved toward or away from the center of the friction disc so that the speed of the same can be regulated.

Mounted at right angles, and above the shaft C is a shaft J, which is mounted in suitable bearings J' which passes transversely underneath the clay column K which passes from the forming die on the auger machine K'. Secured on the shaft J adjacent to each side of the clay column K are crank discs $J^2$, having wrist-pins $J^3$ thereon.

Secured on the end frame of the cutting machine are brackets L, to which are pivoted arms L', having hooked ends $L^2$ adapted to engage the wrist-pins $J^3$ on the discs $J^2$, as they travel upward and across, and thereby pull the cutting machine the distance required as shown by broken lines in Figure 3, the wrist-pins moving downward out of the hooks $L^2$ on the arms L'. The sliding sleeve H can be moved on the shaft G so as to cause the shaft J and its discs $J^2$ to rotate fast enough so as to be on the up coming side of the circle by the time its hooks $L^2$ have moved back ready to be engaged by the upcoming wrist-pins. Said hooks should be there waiting for the up coming wrist-pins.

Attached to the opposite end of the machine is a cable M (see Figs. 1 and 4) which passes over a pulley M' and is provided with weights M². These weights M² travel up and down in a vertical casing M³ and a weight m placed on the top of the weights M² is large enough to set down upon the upper end of the casing M³, so that the weights only start with the weight m, which travels only until it seats upon the upper end of the casing M³ where it stops, and the rest of the weights travel to the end of their course.

When the cutting machine has been drawn backward until the wrist-pins move downward out of the hooks L² the latch m' lifts upward and prevents the machine frame from moving backward.

Secured on the opposite end of the machine frame A' are brackets N, one at each side of the column of bricks, and mounted between said brackets N is a roller N' which rests upon, and is propelled by the moving column of clay or bricks, which pass thereunder.

On the end of the journal of this roller N' is a wrist-pin N² upon which is placed a pitman n which passes through a loop n² on the machine frame to support the lower end of said pitman, so that when the roller N' makes a complete revolution by reason of clay passing thereunder, the latch m' will be pushed down and the cutting machine will be free to move in unison with the clay column.

Adjacent to the forward ends of the brackets N I mount a stop O, upon a pivot O' and it is provided with a weight O² so that when the column of clay pushes the cut bricks through the machine the first brick engages the stop, and the force of the brick together with the weights M² and M start the machine moving in unison with the clay column as soon as the latch m' is pushed down by the pitman n.

P indicates an arm secured to the frame of the carry-off belt, and is provided with a pin p which projects into the path of one of the weights O² of the stop O, so that as the machine approaches the end of its travel the weight O² hits the pin p in its path, and the same is tipped over backward, and the stop O is held raised until the roller N' causes the pitman n to open the latch m' at which time a stud P² engages a lever P' one end of which is pivoted to the bracket N, and the free end thereof engages said stop O and pushes down the same when it pushes down the latch m', so that the incoming column of clay will push forward the cutting machine as soon as the initial end thereof engages the weight O².

The weights M² and m are nearly heavy enough to move the cutting machine forward, and when the pressure of the column of clay is added the machine will move forward until it is stopped by the stop Q.

Having thus fully described the construction of mechanism for reciprocating the cutting mechanism so that others can construct and operate the same, it is obvious that many modifications and changes can be made therein without departing from the scope of my invention, therefore what I claim as new and desire to secure by Letters Patent is:

1. A brick cutting machine adapted to reciprocate during the cutting operation, a driven shaft, a shaft mounted transversely to said driven shaft, gear mechanism to actuate said transverse shaft, means to regulate the rotation of said gears and transverse shaft with relation to said driven shaft, a crank on said transverse shaft, an arm on the frame of said brick cutting machine, a hook on the free end of said arm adapted to engage said crank on the upward movement thereof.

2. A brick cutting machine adapted to reciprocate during the cutting operation, a shaft mounted transversely thereto, a disc mounted on said shaft, a wrist-pin on said disc, a power shaft, a friction pulley mounted and slidably secured on said shaft, a bevel gear wheel, a friction disc on said wheel, a bevel gear on the first mentioned shaft intermeshing with the last mentioned bevel gear wheel, means adapted to regulate the speed of said bevel gears, an arm hinged to the frame of the cutting machine, a hook on the free end of said arm adapted to engage said wrist-pin on its upward movement, and release the same on its downward movement.

3. A brick cutting machine adapted to reciprocate during the cutting operation, a cable secured to one end of the machine, a weight on said cable adapted to pull the machine toward the weight, an arm pivoted to the machine, a hook on the free end of said arm, a shaft, a disc thereon, a wrist-pin on said disc adapted to be engaged by said upcoming wrist-pin and pull the machine forward and release the same at its downward movement.

4. A brick cutting machine, a bracket secured on the frame of said machine at the discharge end thereof, a measuring wheel mounted on said bracket and adapted to ride upon the column of clay passing thereunder, a pitman operated by said measuring roller, a latch adapted to be pressed down by said pitman, a weighted stop hinged on said bracket and adapted to be swung down in front of the column of brick by said pitman.

5. A brick cutting machine, a bracket secured on the frame at the discharge end thereof, a measuring wheel mounted on said bracket, a latch adapted to swing upward in front of said machine, a pitman adapted to be operated by said measuring wheel to press down said latch, a weighted stop pivoted on said bracket and adapted to be swung down in front of the column of brick, a lever fulcrumed on said bracket, a stud on said pitman adapted to engage said lever and cause the same to swing said weighted stop downward, and a release stop in the path of the weighted stop adapted to swing said weighted stop upward.

6. A brick cutting machine, a measuring wheel mounting thereon and adapted to be rotated by a column of clay, a latch adapted to engage said machine when it has reached the limit of its left-hand reciprocation, and a pitman adapted to be operated by said measuring wheel to release said latch.

7. A brick cutting machine adapted to be reciprocated transversely of the clay column, a shaft mounted transversely thereto, a disc secured on said transverse shaft, a wrist pin secured on said disc, a driven shaft receiving power from a prime mover, means actuated by said driven shaft to rotate said transverse shaft and disc one revolution at the completion of each cutting operation, means on said machine adapted to be engaged by said wrist pin at the completion of the cutting operation, and be disengaged therefrom at the completion of the backward reciprocation of said machine, and adjustable means to regulate the speed of said transverse shaft with reference to said driven shaft.

8. A brick machine, a measuring wheel mounted thereon and adapted to be rotated by a column of clay, a latch adapted to engage said machine when it has reached the limit of its left hand reciprocation, a pitman adapted to be operated by said measuring wheel to release said latch, a driven shaft, a shaft transverse thereto, a disc thereon, a wrist pin on said disc, means actuated by said driven shaft to rotate said transverse shaft, and means on said machine adapted to be engaged by said wrist pin when said latch has been released, and be released therefrom when the right hand reciprocation of said machine is completed.

In testimony whereof I affix my signature.

FRANK B. DUNN.